(12) United States Patent
Lee

(10) Patent No.: US 8,812,194 B2
(45) Date of Patent: Aug. 19, 2014

(54) SYSTEM AND METHOD FOR PREVENTING STEERING PULL IN VEHICLE

(75) Inventor: Sey Bok Lee, Gyeonggi-do (KR)

(73) Assignee: Hyundai Mobis Co., Ltd., Seoul (KR)

( * ) Notice: Subject to any disclaimer, the term of this patent is extended or adjusted under 35 U.S.C. 154(b) by 393 days.

(21) Appl. No.: 13/215,597

(22) Filed: Aug. 23, 2011

(65) Prior Publication Data

US 2012/0226416 A1 Sep. 6, 2012

(30) Foreign Application Priority Data

Mar. 3, 2011 (KR) .......................... 10-2011-0019021

(51) Int. Cl.
*B62D 6/00* (2006.01)
*B62D 12/00* (2006.01)

(52) U.S. Cl.
USPC .................................. 701/42; 701/41; 701/43

(58) Field of Classification Search
USPC ......... 701/41, 42, 43; 180/446, 444, 443, 412
See application file for complete search history.

(56) References Cited

U.S. PATENT DOCUMENTS

| 7,753,162 | B2 * | 7/2010 | Shiozawa et al. | 180/446 |
|---|---|---|---|---|
| 2006/0041358 | A1 * | 2/2006 | Hara | 701/41 |
| 2007/0029129 | A1 * | 2/2007 | Shiozawa et al. | 180/446 |
| 2011/0029200 | A1 * | 2/2011 | Shah | 701/41 |

FOREIGN PATENT DOCUMENTS

| EP | 1857349 A1 | 11/2007 |
|---|---|---|
| EP | 1932745 A2 | 6/2008 |
| JP | 08-253157 | 10/1996 |
| JP | 2006-282065 A | 10/2006 |
| JP | 2006-327550 A | 12/2006 |
| WO | WO-2010-010441 A1 | 1/2010 |

* cited by examiner

*Primary Examiner* — Khoi Tran
*Assistant Examiner* — Jorge Peche
(74) *Attorney, Agent, or Firm* — Saliwanchik, Lloyd & Eisenschenk

(57) ABSTRACT

A system for preventing a steering pull in a vehicle includes: a sensor unit configured to generate at least one sensing value for at least one of a steering torque, a steering angle, a vehicle speed and a yaw rate of a vehicle; an ECU configured to determine whether or not the vehicle is in a straightforward driving state, based on a predefined straightforward driving state determination criterion by using the at least one sensing value provided from the sensor unit, determine whether or not a steering pull occurs in the vehicle, based on a predefined steering pull determination criterion when it is determined that the vehicle is in the straightforward driving state, and compensate for the steering torque of the vehicle when it is determined that the steering pull occurs in the vehicle; and a motor driving unit configured to generate steering power under the control of the ECU.

18 Claims, 2 Drawing Sheets

SYSTEM AND METHOD FOR PREVENTING STEERING PULL IN VEHICLE

CROSS-REFERENCE TO RELATED APPLICATION

This application claims the benefit under 35 U.S.C §119 of Korean Application No. 10-2011-0019021, filed on Mar. 3, 2011, which is hereby incorporated by reference in its entirety.

BACKGROUND

Exemplary embodiments of the present invention relate to a system and a method for preventing a steering pull in a vehicle, and more particularly, to a system and a method for preventing a steering pull in a vehicle, wherein, when a steering pull occurs as a phenomenon in which a vehicle leans to a left or right side by various lateral loads or other inside and outside factors, the steering pull is sensed and a steering torque is compensated for so that straightforward drivability of the vehicle is improved and safe driving is ensured.

In general, steering apparatuses using power of a vehicle are divided into a hydraulic type which uses an oil and an electronic type which uses an electric motor.

In a hydraulic type steering apparatus, a hydraulic pump as a power unit for generating a hydraulic pressure pumps fluid by virtue of power of an engine and develops a hydraulic pressure. In the hydraulic type steering apparatus, when a driver rotates a steering wheel, the hydraulic pressure is transferred in a steering direction so that steering can be implemented in a smooth and light manner. An MDPS (motor driven power steering) system as an electronic type power steering apparatus is a kind of steering shaft supplementing power steering apparatus in which steering force is increased using an electric motor.

In the MDPS system, unlike the conventional hydraulic steering apparatus (which distributes the power of an engine when a vehicle makes a turn), the electric motor can automatically perform a control function depending upon a running condition so that steering performance and steering feel can be significantly improved. MDPS systems are divided into a column driving type, a pinion driving type, and a rack driving type depending upon a position for supplying a driving force (that is, a motor attachment position), and have the same operation principle.

When a vehicle travels straight forward, a steering pull, in which the vehicle leans to any one of a left side and a right side regardless of a driving intention of a driver, is likely to occur due to lateral loads such as lateral wind and the slope of a road and other inside and outside factors.

In the conventional art, if such a steering pull occurs, disadvantages are caused in that the driver should manipulate a steering wheel with a certain force to apply an additional torque and rotate the steering wheel in a direction opposite to the steering pull so that the straightforwardness of the vehicle is maintained. Due to this fact, the driver is apt to be fatigued and driving safety may be degraded.

BRIEF SUMMARY

Embodiments of the present invention relate to a system and a method for preventing a steering pull in a vehicle, wherein, when a steering pull occurs as a phenomenon in which a vehicle leans to a left or right side by various lateral loads or other inside and outside factors, the steering pull is sensed and a steering torque is compensated for so that straightforward drivability of the vehicle is improved and safe driving is ensured.

According to one aspect of the present invention, there is provided a system for preventing a steering pull in a vehicle, including: a sensor unit configured to generate at least one sensing value for at least one of a steering torque, a steering angle, a vehicle speed and a yaw rate of the vehicle which travels on a road; an ECU (electronic control unit) configured to determine whether or not the vehicle is in a straightforward driving state, based on a predefined straightforward driving state determination criterion by using the at least one sensing value provided from the sensor unit, determine whether or not a steering pull occurs in the vehicle, based on a predefined steering pull determination criterion when it is determined that the vehicle is in the straightforward driving state, and compensate for the steering torque of the vehicle when it is determined that the steering pull occurs in the vehicle; and a motor driving unit configured to generate steering power under the control of the ECU.

In the present invention, the straightforward driving state determination criterion may be determined based on the steering angle, the vehicle speed and the yaw rate provided from the sensor unit.

The ECU may determine that the vehicle is in the straightforward driving state, when the steering angle is smaller than a preset steering angle, the vehicle speed is higher than a preset vehicle speed, and a yaw rate is smaller than a preset yaw rate.

The steering pull determination criterion may be determined based on the steering torque provided from the sensor unit.

The ECU may determine that the steering pull occurs in the vehicle, when an average value of the steering torque through a preset period is larger than a preset torque average value and a steering torque larger than a preset reference torque is continuously applied at least for a preset duration.

When compensating for the steering torque of the vehicle, the ECU may determine a torque compensation amount based on an average value and a standard deviation of the steering torque through the preset period.

The ECU may include: a steering pull determination logic configured to determine whether or not the vehicle is in a straightforward driving state and whether or not a steering pull occurs in the vehicle, based on sensing values for the steering torque, the steering angle, the vehicle speed and the yaw rate, which are provided from the sensor unit; a torque compensation logic configured to calculate and provide a torque compensation amount for the steering torque of the vehicle, based on a determination result of the steering pull determination logic; and an MDPS (motor driven power steering) logic configured to control the motor driving unit based on the torque compensation amount from the torque compensation logic.

According to another aspect of the present invention, there is provided a method for preventing a steering pull in a vehicle, including the steps of: receiving at least one sensing value for at least one of a steering torque, a steering angle, a vehicle speed and a yaw rate of a vehicle which travels on a road, from a sensor unit; determining whether or not the vehicle is in a straightforward driving state, based on a predefined straightforward driving state determination criterion by using the at least one sensing value provided from the sensor unit; determining whether or not a steering pull occurs in the vehicle, based on a predefined steering pull determination criterion when it is determined that the vehicle is in the straightforward driving state; and compensating for the steering torque of the vehicle when it is determined that the steering pull occurs in the vehicle.

DETAILED DESCRIPTION

Hereinafter, embodiments of the present invention will be described with reference to accompanying drawings. However, the embodiments are for illustrative purposes only and are not intended to limit the scope of the invention.

Figure 1:
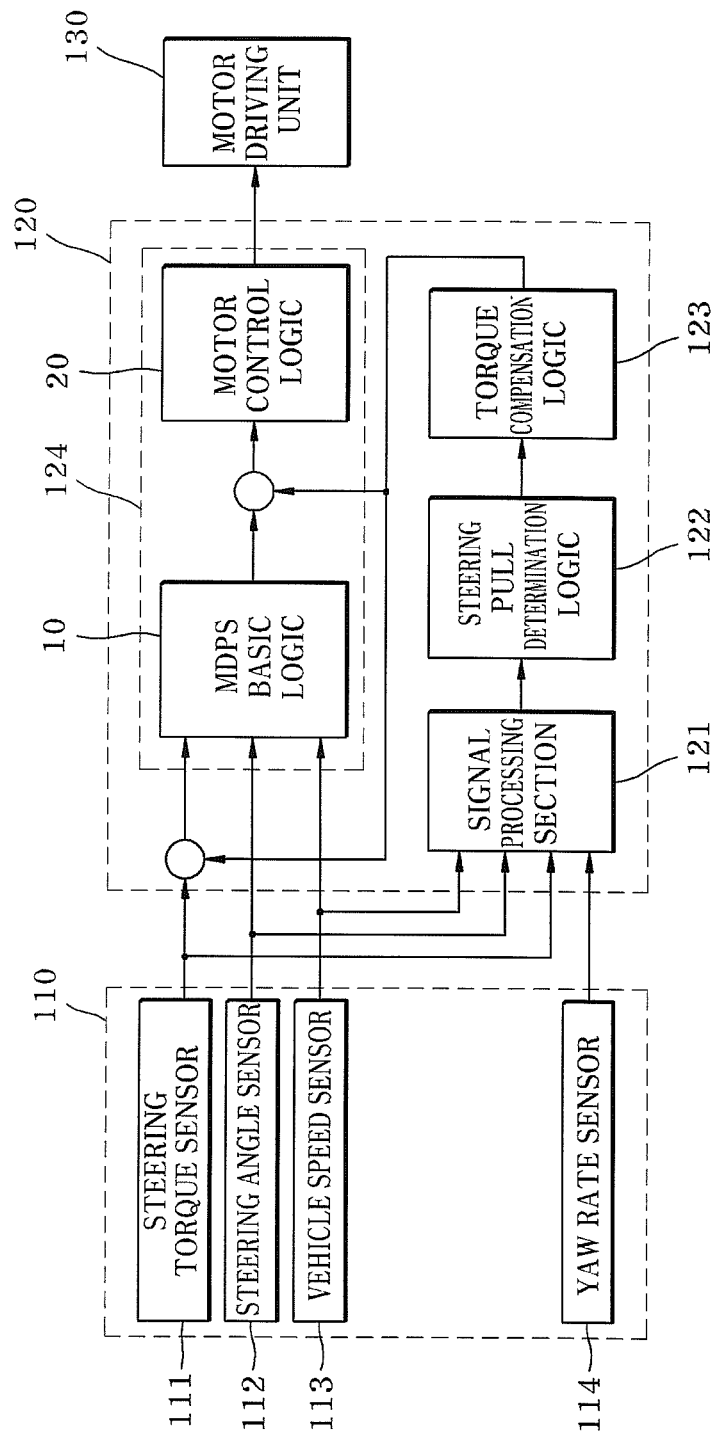
FIG. 1 is a schematic view showing the configuration of a system for preventing a steering pull in a vehicle in accordance with an embodiment of the present invention.
Figure 2:
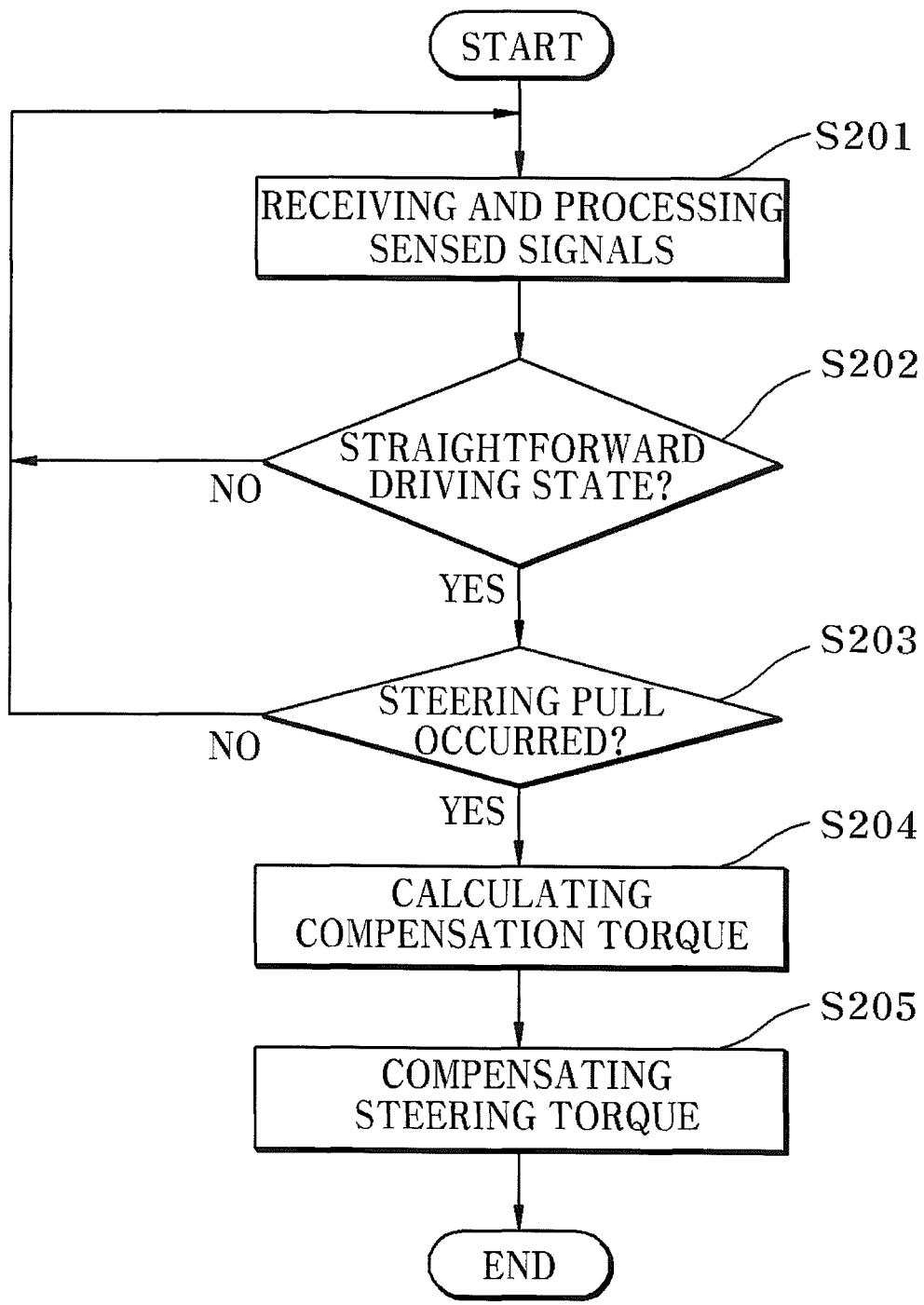
FIG. 2 is a flow chart showing a method for preventing a steering pull in a vehicle in accordance with the embodiment of the present invention.

FIG. 1 is a schematic view showing the configuration of a system for preventing a steering pull in a vehicle in accordance with an embodiment of the present invention, and FIG. 2 is a flow chart showing a method for preventing a steering pull in a vehicle in accordance with the embodiment of the present invention.

Referring to FIG. 1, a system for preventing a steering pull in a vehicle in accordance with an embodiment of the present invention may include a sensor unit 110 configured to generate at least one sensing value for at least one of a steering torque, a steering angle, a vehicle speed and a yaw rate of a vehicle which travels on a road; an ECU (electronic control unit) 120 configured to determine whether or not the vehicle is in a straightforward driving state, based on a predefined straightforward driving state determination criterion by using the at least one sensing value provided from the sensor unit 110, determine whether or not a steering pull occurs in the vehicle, based on a predefined steering pull determination criterion when it is determined that the vehicle is in the straightforward driving state, and compensate for the steering torque of the vehicle when it is determined that the steering pull occurs in the vehicle; and a motor driving unit 130 configured to generate steering power under the control of the ECU 120.

The ECU 120 includes a steering pull determination logic 122 configured to determine whether or not the vehicle is in a straightforward driving state and whether or not a steering pull occurs in the vehicle, based on sensing values for the steering torque, the steering angle, the vehicle speed and the yaw rate, which are provided from the sensor unit 110; a torque compensation logic 123 configured to calculate and provide a torque compensation amount for the steering torque of the vehicle, based on a determination result of the steering pull determination logic 122; and an MDPS (motor driven power steering) logic 124 configured to control the motor driving unit 130 based on the torque compensation amount from the torque compensation logic 123. The sensor unit 110 may include a steering torque sensor 111 for sensing a steering torque, a steering angle sensor 112 for sensing a steering angle, a vehicle speed sensor 113 for sensing a vehicle speed, and a yaw rate sensor 114 for sensing a yaw rate.

Hereafter, operations of the system for preventing a steering pull in a vehicle in accordance with the embodiment of the present invention, configured as mentioned above, will be described in detail with reference to FIGS. 1 and 2.

First, the ECU 120 receives a steering torque, a steering angle, a vehicle speed and a yaw rate from the steering torque sensor 111, the steering angle sensor 112, the vehicle speed sensor 113 and the yaw rate sensor 114 which are included in the sensor unit 110, and a signal processing section 121 of the ECU 120 processes the steering torque, the steering angle, the vehicle speed and the yaw rate and provides processed signals to the steering pull determination logic 122 (S201).

Then, the steering pull determination logic 122 determines whether or not the vehicle is currently in a straightforward driving state, based on the sensed values provided from the sensor unit 110, specifically, the steering angle, the vehicle speed and the yaw rate (S202). If it is determined that the vehicle is currently in a straightforward driving state, a program proceeds to a step S203, and if it is determined that the vehicle is not currently in a straightforward driving state, the program returns to the step S201. Here, the reason to check whether or not the vehicle is currently in a straightforward driving state is because a steering pull of the vehicle raises an issue only when a driver actually manipulates a steering wheel to drive the vehicle in a straightforward direction. In other words, in the case that the driver actually manipulates the steering wheel to make a left turn or a right turn, whether or not a steering pull occurs does not cause any problem.

The steering pull determination logic 122 determines whether or not the vehicle is in a straightforward driving state, based on the predefined straightforward driving state determination criterion. That is to say, the steering pull determination logic 122 determines that the vehicle is in a straightforward driving state, when a sensed steering angle is smaller than a preset steering angle (for example, 5°), a sensed vehicle speed is higher than a preset vehicle speed, and a yaw rate is smaller than a preset yaw rate (for example, 0.4~0.6 deg/s).

Next, when it is determined that the vehicle is in a straightforward driving state, the steering pull determination logic 122 determines whether or not a steering pull occurs in the vehicle, based on a predefined steering pull determination criterion (S203). If it is determined that a steering pull occurs in the vehicle, the program proceeds to a step S204. Otherwise, the program returns to the step S201. The steering pull determination criterion depends on a steering torque provided from the sensor unit 110. In detail, it is determined that a steering pull occurs in the vehicle, when an average value of the steering torque through a preset period is larger than a preset torque average value and a steering torque larger than a preset reference torque is continuously applied at least for a preset duration. Namely, if an average torque value is larger than the preset torque average and a torque larger than the preset reference torque is maintained for the preset duration, it may be determined that the vehicle leans to one side. That is to say, the steering pull determination logic 122 determines whether or not a steering pull occurs in the vehicle, based on the predefined steering pull determination criterion. Detailed numerical values of the steering pull determination criterion may vary depending upon a system designer and thus are omitted herein.

In succession, when it is determined in the step S203 that a steering pull occurs in the vehicle, the torque compensation logic 123 calculates a torque compensation amount based on an average value and a standard deviation of the steering torque through the preset period, and provides the calculated torque compensation amount to the MDPS logic 124 (S204). Specifically, a torque compensation amount may be determined as a value that is obtained by multiplying a steering torque sensed as a result of a steering pull phenomenon by a value corresponding to W of the following Mathematical Expression 1.

$$W = 1 - \text{(standard deviation of steering torque)}/\text{(average value of steering torque)} \qquad \text{Mathematical Expression 1}$$

W calculated in the Mathematical Expression 1 may be a value corresponding to approximately 0.8. The reason why a torque compensation amount is determined by applying such a value resides in that, if an excessive compensation approaching 100% is implemented for a steering pull, the vehicle may lean to the other side opposite to one side to which the vehicle actually leans, as a result of which the driver may confusingly perceive a situation as if a steering pull occurs to the other opposite side. That is to say, the torque compensation amount is determined within a range in which the driver is not overstrained due to manipulation of a steering wheel, so that the driver is not confused.

When compensating for the steering torque of the vehicle, the torque compensation logic 123 may determine a torque compensation amount in such a way that the torque compensation amount linearly increases or decreases for a predetermined period. The reason for this is to allow a torque compensation amount to gradually and linearly increase or decrease for the predetermined period, so that a steering torque is prevented from being abruptly changed and steering torque compensation may be implemented in a smooth manner.

Finally, the MDPS logic 124 controls the motor driving unit 130 according to a steering torque to be compensated based on the torque compensation amount provided from the torque compensation logic 123 (S205). At this time, in the case that the torque compensation amount calculated by the torque compensation logic 123 is relatively small, that is, when a relatively low degree of torque compensation is required, the torque compensation amount is applied to the steering torque from the steering torque sensor 111, and steering torque compensation is implemented by an MDPS basic logic 10. Conversely, in the case that the torque compensation amount calculated by the torque compensation logic 123 is relatively large, that is, when a relatively high degree of torque compensation is required, the torque compensation amount is directly applied to a motor control logic 20, and then, steering torque compensation is implemented by the motor control logic 20.

As is apparent from the above descriptions, the system and method for preventing a steering pull in a vehicle in accordance with the embodiments of the present invention provide advantages in that, when a steering pull occurs as a phenomenon in which a vehicle leans to a left or right side by various lateral loads or other inside and outside factors, the steering pull is sensed and a steering torque is compensated for so that straightforward drivability of the vehicle is improved and safe driving is ensured.

The embodiments of the present invention have been disclosed above for illustrative purposes. Those skilled in the art will appreciate that various modifications, additions and substitutions are possible, without departing from the scope and spirit of the invention as disclosed in the accompanying claims.

What is claimed is:

1. A system for preventing a steering pull in a vehicle, comprising:
    a sensor unit configured to generate at least one sensing value for at least one of a steering torque, a steering angle, a vehicle speed and a yaw rate of the vehicle which travels on a road;
    an ECU (electronic control unit) configured to determine whether or not the vehicle is in a straightforward driving state, based on a predefined straightforward driving state determination criterion by using the at least one sensing value provided from the sensor unit, determine whether or not a steering pull occurs in the vehicle, based on a predefined steering pull determination criterion when it is determined that the vehicle is in the straightforward driving state, and compensate for the steering torque of the vehicle when it is determined that the steering pull occurs in the vehicle; and
    a motor driving unit configured to generate steering power under the control of the ECU;
    wherein, when compensating for the steering torque of the vehicle, the ECU determines a torque compensation amount based on an average value and a standard deviation of the steering torque through a preset period.

2. The system of claim 1, wherein the straightforward driving state determination criterion is determined based on the steering angle, the vehicle speed and the yaw rate provided from the sensor unit.

3. The system of claim 2, wherein the ECU determines that the vehicle is in the straightforward driving state, when the steering angle is smaller than a preset steering angle, the vehicle speed is higher than a preset vehicle speed, and a yaw rate is smaller than a preset yaw rate.

4. The system of claim 1, wherein the steering pull determination criterion is determined based on the steering torque provided from the sensor unit.

5. The system of claim 4, wherein the ECU determines that the steering pull occurs in the vehicle, when an average value of the steering torque through a preset period is larger than a preset torque average value and a steering torque larger than a preset reference torque is continuously applied at least for a preset duration.

6. The system of claim 1,
    wherein the straightforward driving state determination criterion is determined based on the steering angle, the vehicle speed and the yaw rate provided from the sensor unit, and
    wherein the steering pull determination criterion is determined based on the steering torque provided from the sensor unit.

7. The system of claim 6,
    wherein the ECU determines that the vehicle is in the straightforward driving state, when the steering angle is smaller than a preset steering angle, the vehicle speed is higher than a preset vehicle speed, and a yaw rate is smaller than a preset yaw rate, and
    wherein the ECU determines that the steering pull occurs in the vehicle, when an average value of the steering torque through a preset period is larger than a preset torque average value and a steering torque larger than a preset reference torque is continuously applied at least for a preset duration.

8. The system of claim 1, wherein, when compensating for the steering torque of the vehicle, the ECU determines the torque compensation amount in such a way that the torque compensation amount linearly increases or decreases for a predetermined period.

9. The system of claim 1, wherein the ECU comprises:
    a steering pull determination logic configured to determine whether or not the vehicle is in a straightforward driving state and whether or not a steering pull occurs in the vehicle, based on sensing values for the steering torque, the steering angle, the vehicle speed and the yaw rate, which are provided from the sensor unit;
    a torque compensation logic configured to calculate and provide a torque compensation amount for the steering torque of the vehicle, based on a determination result of the steering pull determination logic; and an MDPS (motor driven power steering) logic configured to control the motor driving unit based on the torque compensation amount from the torque compensation logic.

10. The system of claim 9, wherein, when compensating for the steering torque of the vehicle, the torque compensation logic calculates a torque compensation amount based on an average value and a standard deviation of the steering torque through a preset period.

11. A method for preventing a steering pull in a vehicle, comprising the steps of:
receiving at least one sensing value for at least one of a steering torque, a steering angle, a vehicle speed and a yaw rate of a vehicle which travels on a road, from a sensor unit;
determining whether or not the vehicle is in a straightforward driving state, based on a predefined straightforward driving state determination criterion by using the at least one sensing value provided from the sensor unit;
determining whether or not a steering pull occurs in the vehicle, based on a predefined steering pull determination criterion when it is determined that the vehicle is in the straightforward driving state; and
compensating for the steering torque of the vehicle when it is determined that the steering pull occurs in the vehicle;
wherein, when compensating for the steering torque of the vehicle, a torque compensation amount is determined based on an average value and a standard deviation of the steering torque through a preset period.

12. The method of claim 11, wherein the straightforward driving state determination criterion is determined based on the steering angle, the vehicle speed and the yaw rate provided from the sensor unit.

13. The method of claim 12, wherein it is determined that the vehicle is in the straightforward driving state, when the steering angle is smaller than a preset steering angle, the vehicle speed is higher than a preset vehicle speed, and a yaw rate is smaller than a preset yaw rate.

14. The method of claim 11, wherein the steering pull determination criterion is determined based on the steering torque provided from the sensor unit.

15. The method of claim 14, wherein it is determined that the steering pull occurs in the vehicle, when an average value of the steering torque through a preset period is larger than a preset torque average value and a steering torque larger than a preset reference torque is continuously applied at least for a preset duration.

16. The method of claim 11,
wherein the straightforward driving state determination criterion is determined based on the steering angle, the vehicle speed and the yaw rate provided from the sensor unit, and
wherein the steering pull determination criterion is determined based on the steering torque provided from the sensor unit.

17. The method of claim 16,
wherein it is determined that the vehicle is in the straightforward driving state, when the steering angle is smaller than a preset steering angle, the vehicle speed is higher than a preset vehicle speed, and a yaw rate is smaller than a preset yaw rate, and
wherein it is determined that the steering pull occurs in the vehicle, when an average value of the steering torque through a preset period is larger than a preset torque average value and a steering torque larger than a preset reference torque is continuously applied at least for a preset duration.

18. The method of claim 11, wherein, when compensating for the steering torque of the vehicle, the torque compensation amount is determined in such a way that the torque compensation amount linearly increases or decreases for a predetermined period.

* * * * *